(12) United States Patent
Grenn

(10) Patent No.: US 8,055,400 B2
(45) Date of Patent: Nov. 8, 2011

(54) CONTROL SYSTEM AND METHOD FOR FILTERING DEPENDENT DIAGNOSTIC TROUBLE CODES

(75) Inventor: Daniel P. Grenn, Highland, MI (US)

(73) Assignee: GM Global Technology Operations LLC

( * ) Notice: Subject to any disclaimer, the term of this patent is extended or adjusted under 35 U.S.C. 154(b) by 551 days.

(21) Appl. No.: 12/251,021

(22) Filed: Oct. 14, 2008

(65) Prior Publication Data

US 2009/0271062 A1 Oct. 29, 2009

Related U.S. Application Data

(60) Provisional application No. 61/047,832, filed on Apr. 25, 2008.

(51) Int. Cl.
*B60Q 1/00* (2006.01)
*G01M 17/00* (2006.01)

(52) U.S. Cl. .............................. 701/29; 701/34; 340/438

(58) Field of Classification Search .................... 701/29, 701/34, 36, 43, 39, 40; 340/425.5, 438, 439
See application file for complete search history.

(56) References Cited

U.S. PATENT DOCUMENTS

| | | | | |
|---|---|---|---|---|
| 5,729,452 A | * | 3/1998 | Smith et al. | 701/29 |
| 5,835,871 A | * | 11/1998 | Smith et al. | 701/29 |
| 6,947,817 B2 | * | 9/2005 | Diem | 701/34 |
| 2005/0240289 A1 | * | 10/2005 | Hoyte et al. | 700/49 |
| 2007/0153827 A1 | | 7/2007 | Lee | |
| 2009/0295559 A1 | * | 12/2009 | Howell et al. | 340/459 |

FOREIGN PATENT DOCUMENTS

CN 1992721 A 7/2007

* cited by examiner

*Primary Examiner* — Sarah B McPartlin

(57) ABSTRACT

A control system includes an input that one of receives and transmits diagnostic data including a fault identifier and a fault status of the fault identifier, and a filter module that filters said diagnostic data based on a comparison of the diagnostic data and a data array, wherein the data array includes a dependent identifier and a corresponding root cause identifier. The control system may be included with one or more of a vehicle control module and a service tool. A related method is also provided.

12 Claims, 5 Drawing Sheets

CONTROL SYSTEM AND METHOD FOR FILTERING DEPENDENT DIAGNOSTIC TROUBLE CODES

CROSS-REFERENCE TO RELATED APPLICATIONS

This application claims the benefit of U.S. Provisional Application No. 61/047,832, filed on Apr. 25, 2008. The disclosure of the above application is incorporated herein by reference.

FIELD

The present disclosure relates to diagnostic systems for vehicles, and more particularly, to diagnostic systems and methods for filtering diagnostic trouble codes.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Motorized vehicles may include a powertrain (e.g., an engine, an electric motor and/or a combination thereof) that produces drive torque that is transmitted through a transmission to wheels of the vehicle. Operation of the powertrain and transmission may be regulated by one or more control modules. The control modules may include self-diagnostic capabilities to detect faults that may affect engine performance, emissions, braking, and other onboard systems of the vehicle. Specifically, the control modules may include diagnostic programs or instructions that may detect faults with driver interface devices (e.g., accelerator pedal), sensors (e.g., manifold temperature sensor), and actuators (e.g., throttle valve) of the vehicle.

When a fault is detected for one of the driver interface devices, sensors, or actuators, the control modules may generate a diagnostic trouble code that identifies the specific fault detected. The control modules may save the diagnostic trouble code in memory. The control modules may also store and update a fault status of each stored diagnostic trouble code. The fault status may indicate whether the corresponding fault has been confirmed by the diagnostic programs. When certain diagnostic codes are generated, the control modules may illuminate a warning light on an information display of the vehicle, such as a "Check Engine" light. Similarly, when certain diagnostic codes obtain a particular fault status, the control modules may illuminate the warning light.

On many vehicles, a service tool may be used to diagnose and repair problems with the vehicle. The service tool may be used to access and retrieve the diagnostic trouble codes stored in memory. Typically, the service tool communicates with one or more of the control modules to retrieve the stored diagnostic trouble codes. The diagnostic trouble codes may then be used in conjunction with the vehicle's service manual and other service procedures to determine which driver interface devices, sensors, and actuators should be tested to fully diagnose the problem. The service tool may also be used to modify or clear the diagnostic trouble codes and related fault status stored in memory.

SUMMARY

In one form, the present disclosure provides a control system including an input that one of receives and transmits diagnostic data including a fault identifier and a fault status of the fault identifier, and a filter module that filters said diagnostic data based on a comparison of the diagnostic data and a data array, wherein the data array includes a dependent identifier and a corresponding root cause identifier. The present disclosure further provides the control system may be included with one or more of a vehicle control module and a service tool.

In one feature, the filter module filters the diagnostic data when communicating the diagnostic data to a service tool. In a related feature, the filter module filters the diagnostic data based on a service mode of the service tool.

In another feature, the diagnostic data includes a first fault identifier and a first fault status of the first fault identifier, and a second fault identifier and a second fault status of the second fault identifier, each of the first and second fault statuses includes a failed since code clear status, a confirmed status, and an indicator lamp request status, and the filter module filters the first fault identifier when the first fault identifier is equal to the dependent identifier and a logical expression ((X AND Y) AND (S OR ~T)) is TRUE, wherein X is TRUE when the second fault identifier is equal to the root cause identifier and the confirmed status of the second fault identifier is TRUE, Y is TRUE when the failed since code clear status of the first fault identifier is TRUE, S is TRUE when the Indicator lamp request status of the second fault identifier is TRUE, and ~T is TRUE when the Indicator lamp request status of the first fault identifier is not TRUE.

In yet another feature, the diagnostic data includes a first fault identifier and a first fault status of the first fault identifier, and a second fault identifier and a second fault status of the second fault identifier, each of the first and second fault statuses includes a failed since code clear status, a confirmed status, and an indicator lamp request status, and the filter module filters the first fault identifier when the first fault identifier is equal to the dependent identifier and a logical expression ((W AND Y AND ~Z) AND (S OR ~T)) is TRUE, wherein W is TRUE when the second fault identifier is equal to the root cause identifier and the failed since code clear status of the second fault identifier is TRUE, Y is TRUE when the failed since code clear status of the first fault identifier is TRUE, ~Z is TRUE when the confirmed status of the first fault identifier is not TRUE, S is TRUE when the Indicator lamp request status of the second fault identifier is TRUE, and ~T is TRUE when the Indicator lamp request status of the first fault identifier is not TRUE.

In another form, the present disclosure provides a method comprising receiving diagnostic data including a fault identifier and a fault status of the fault identifier, and filtering the diagnostic data based on a comparison of the diagnostic data and a data array, wherein the data array includes a dependent identifier and a corresponding root cause identifier.

In one feature, the filtering the diagnostic data includes filtering the diagnostic data when communicating to a service tool. In a related feature, the filtering the diagnostic data includes filtering the diagnostic data based on a service mode of the service tool.

In another feature, the diagnostic data includes a first fault identifier and a first fault status of the first fault identifier, and a second fault identifier and a second fault status of the second fault identifier, each of the first and second fault statuses includes a failed since code clear status, a confirmed status, and an indicator lamp request status, and the filtering the diagnostic data includes filtering the first fault identifier when the first fault identifier is equal to the dependent identifier and a logical expression ((X AND Y) AND (S OR ~T)) is TRUE, wherein X is TRUE when the second fault identifier is equal to the root cause identifier and the confirmed status of the second fault identifier is TRUE, Y is TRUE when the failed since code clear status of the first fault identifier is TRUE, and S is TRUE when the Indicator lamp request status of the second fault identifier is TRUE.

In yet another feature, the diagnostic data includes a first fault identifier and a first fault status of the first fault identifier, and a second fault identifier and a second fault status of the second fault identifier, each of the first and second fault statuses includes a failed since code clear status, a confirmed status, and an indicator lamp request status, and the filtering the diagnostic data includes filtering the first fault identifier when the first fault identifier is equal to the dependent identifier and a logical expression ((W AND Y AND ~Z) AND (S OR ~T)) is TRUE, wherein W is TRUE when the second fault identifier is equal to the root cause identifier and the failed since code clear status of the second fault identifier is TRUE, Y is TRUE when the failed since code clear status of the first fault identifier is TRUE, ~Z is TRUE when the confirmed status of the first fault identifier is not TRUE, S is TRUE when the Indicator lamp request status of the second fault identifier is TRUE, and ~T is TRUE when the Indicator lamp request status of the first fault identifier is not TRUE.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
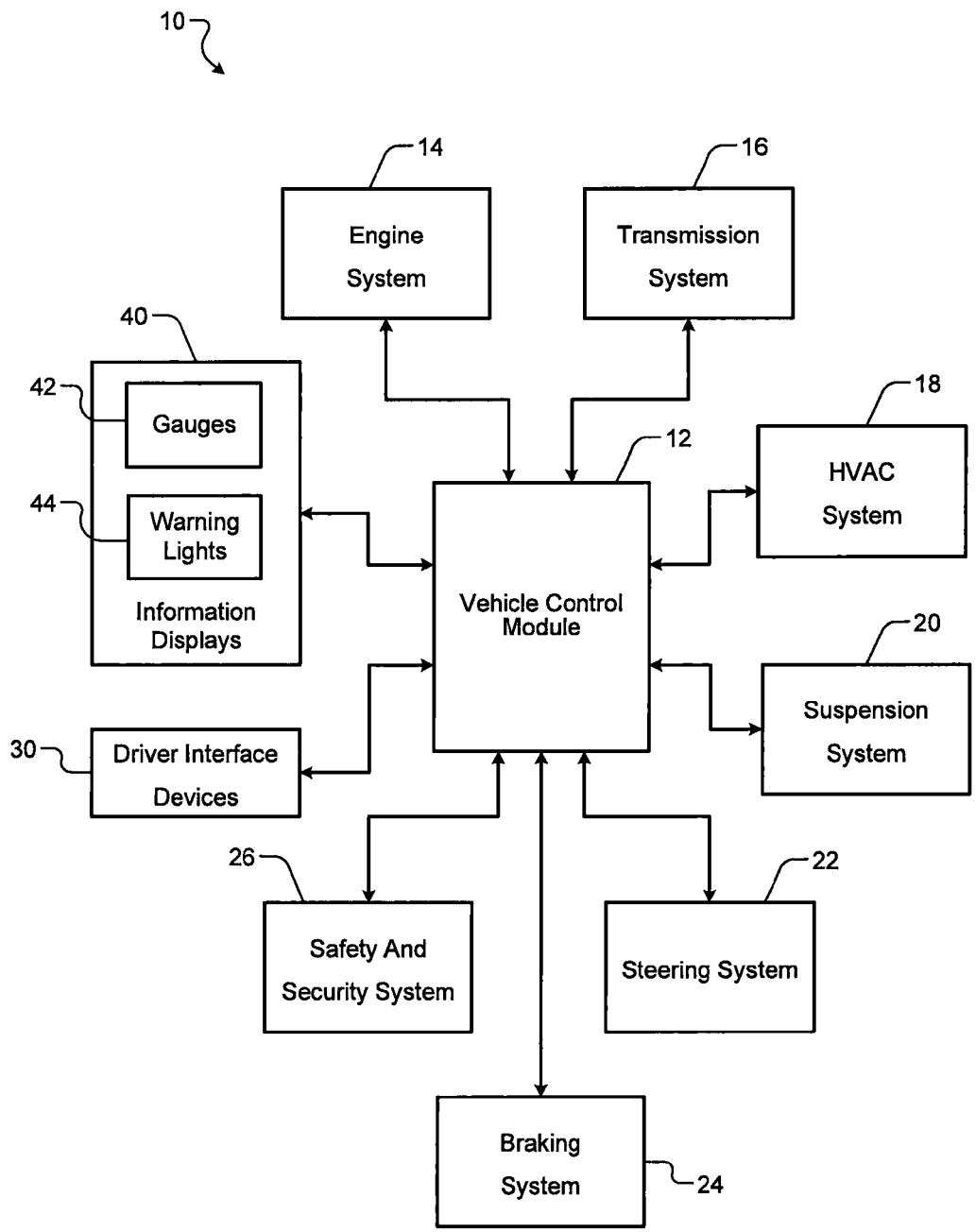
FIG. 1 is a functional block diagram illustrating an exemplary vehicle system.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Diagnostic instructions that are used to detect faults may generate two or more diagnostic trouble codes as a result of a single underlying problem. When two or more diagnostic trouble codes are generated for a single underlying problem, one or more of the diagnostic trouble codes may mislead the diagnosis and repair of the underlying problem. Accordingly, the present disclosure provides an exemplary control system and method for filtering certain diagnostic trouble codes that may be caused by or are otherwise dependent on other diagnostic trouble codes. Dependent diagnostic trouble codes may be filtered when communicating the diagnostic trouble codes for the purpose of diagnosis and repair. Filtering the dependent diagnostic trouble codes may help reduce the time and cost (e.g., warranty cost) required to diagnose and repair the problem. Filtering may also help reduce the time required to develop the diagnostic instructions and provide additional flexibility in the service procedures related to changes in the hardware included with the vehicle.

With reference to FIG. 1, an exemplary vehicle system 10 is shown. The vehicle system 10 may include a vehicle control module 12 that regulates one or more vehicle subsystems that may include an engine system 14 and a transmission system 16. The vehicle control module 12 may also regulate other vehicle subsystems, such as an HVAC system 18, a suspension system 20, a steering system 22, a braking system 24, and a safety and security system 26. The vehicle control module 12 may regulate the various vehicle subsystems based on signals it receives from various driver interface devices 30, such an accelerator pedal, transmission gear selector, brake pedal, and other similar devices.

The vehicle control module 12 may communicate with information displays 40 that may display important information regarding the operation of the various vehicle subsystems to a driver of the vehicle. The information displays may include various gauges 42. The gauges 42 may include, for example, a speedometer that indicates vehicle speed. The information displays 40 may also include warning lights 44 that may indicate whether there is or may be a problem with one of the vehicle subsystems. The warning lights 44 may include, for example, a brake system warning light that indicates whether there is or may be a problem with the braking system 24. The warning lights 44 may also include a malfunction indicator lamp (MIL) that may indicate whether there is or may be a problem with the fuel, ignition, or emission control systems of the engine system 14.

Figure 2:
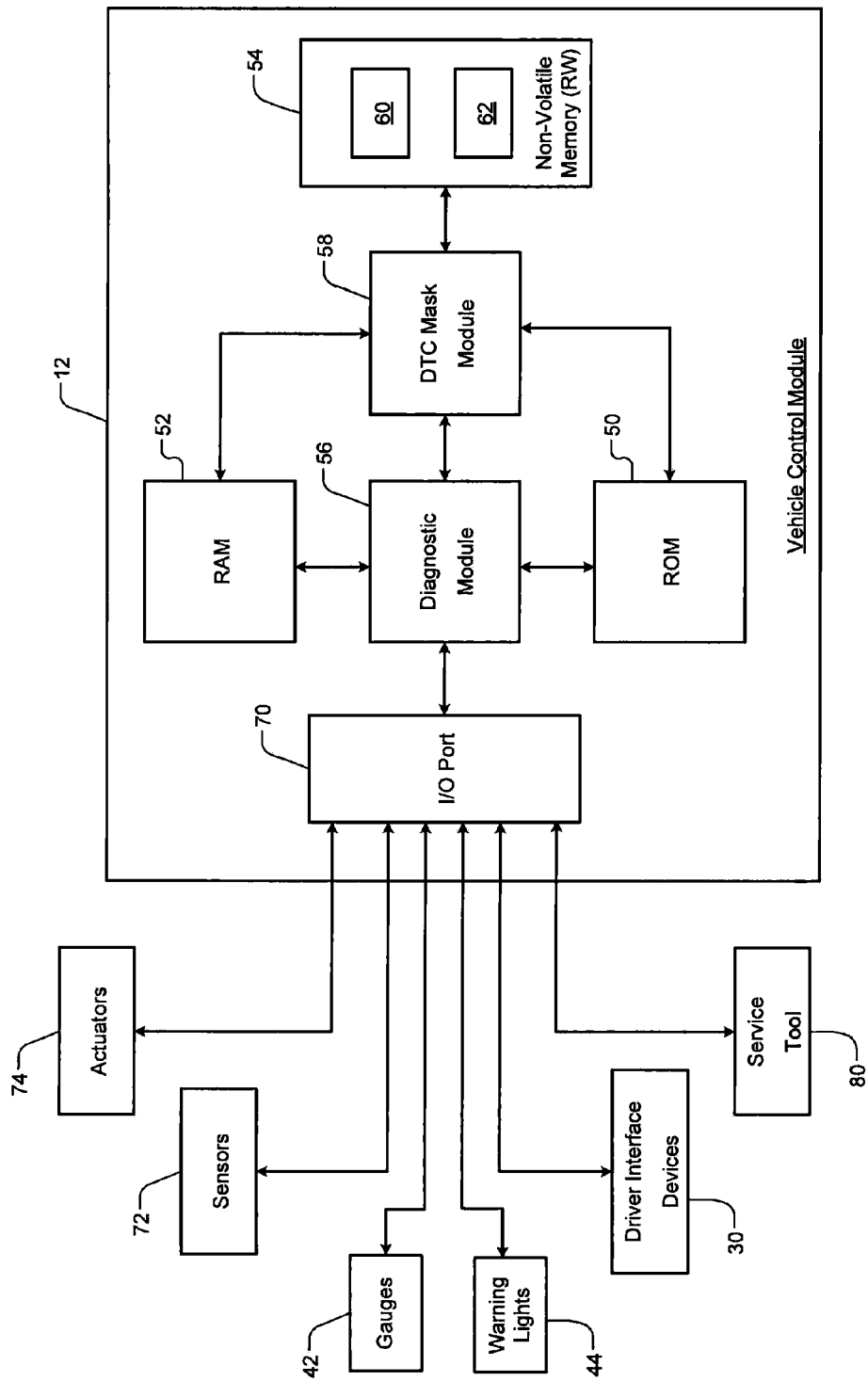
FIG. 2 is a functional block diagram illustrating an exemplary vehicle control module and system according to the principles of the present disclosure.

With reference now to FIG. 2, an exemplary vehicle control module 12 according to the principles of the present disclosure will now be described. The vehicle control module 12 may include one or more modules that communicate with various types of memory such as a read only memory (ROM) 50, a random access memory (RAM) 52, and a non-volatile memory 54. The non-volatile memory 54 may be rewritable. The vehicle control module 12 may include an engine control module (not shown) for regulating the operation of the engine system 14. The vehicle control module 12 may include additional modules for regulating the operation of the other vehicle subsystems (e.g., safety and security system 26).

The vehicle control module 12 may further include a diagnostic module 56 and a DTC mask module 58. The diagnostic module 56 may detect faults with the various vehicle subsystems and driver interface devices 30 and may communicate diagnostic data indicating the faults detected. The diagnostic module 56 may store diagnostic trouble codes (DTCs) in memory that may be used to identify the particular fault detected. The diagnostic module 56 may also store corresponding diagnostic fault information and a status of the DTCs. For example, the diagnostic module 56 may store DTCs and other diagnostic fault information in a stored DTC data table 60. The stored DTC data table 60 may be located in non-volatile memory 54.

The DTC mask module 58 may be used to communicate diagnostic data between diagnostic module 56 and non-volatile memory 54. Additionally, the DTC mask module 58 may be used to filter the diagnostic data stored in the stored DTC data table 60. Filtering of the diagnostic data may be desired to improve servicing of the vehicle system 10 as discussed in further detail below.

To this end, the DTC mask module 58 may retrieve dependent DTC and root cause DTC identifiers from a filter depend DTC data table 62 stored in memory. The DTC mask module 58 may determine a filter depend status for each DTC stored in the stored DTC data table 60. The DTC mask module 58 may determine the filter depend status for each stored DTC by comparing the stored diagnostic data and the information stored in the filter depend DTC data table 62. The DTC mask module 58 may store and periodically update the filter depend status for each DTC in the stored DTC data table 60. The filter depend DTC data table 62 may be located in non-volatile memory 54 as shown.

The vehicle control module 12 may further include a communication (I/O) port 70 which may be controlled by one or more of the modules, such as diagnostic module 56. The I/O port 70 may transfer information (e.g., data, signals, and the like) between the vehicle control module 12 and sensors 72 and actuators 74 associated with the various vehicle subsystems. The I/O port 70 also may transfer information between the vehicle control module 12 and the gauges 42, warning lights 44, and driver interface devices 30.

During servicing of the vehicle system 10, the I/O port 70 may transfer information between the vehicle control module 12 and a service tool 80. The service tool 80 may be connected to the I/O port 70 via a diagnostic link connector (not shown). In this manner, the service tool 80 may be used to request and thereby retrieve DTCs stored in the stored DTC data table 60. The service tool 80 also may be used to modify or clear DTCs and related diagnostic fault information stored in the stored DTC data table 60.

In operation, the diagnostic module 56 may periodically execute diagnostic instructions that may be stored in ROM 50. When the diagnostic module 56 detects a fault, it may store the corresponding DTC in the stored DTC data table 60. Based on the diagnostic instructions, the diagnostic module 56 also may store and update other diagnostic fault information that indicates a status for the DTCs stored in the stored DTC data table 60.

For example only, the diagnostic module 56 may store and update diagnostic fault information such as, but not limited to, whether the stored DTC has failed since the stored DTC was last cleared, whether the stored DTC is confirmed, and whether a request to illuminate the MIL has been generated. The foregoing diagnostic fault information may be used to indicate a fault status of each stored DTC. The diagnostic module 56 also may clear certain diagnostic fault information stored in the stored DTC data table 60 after a predetermined interval of time (e.g., two weeks) without a fault. The diagnostic module 56 may also store freeze frame data that indicates certain conditions that existed at the time the fault was detected.

As discussed herein, stored DTCs may be confirmed failed when the diagnostic module 56 has confirmed the fault that generated the stored DTC. The diagnostic module 56, according to the diagnostic instructions, may confirm the fault where the fault has been detected more than once within a predetermined amount of vehicle drive time or vehicle drive cycles. Generally a request to illuminate the MIL will be generated when the stored DTC is confirmed failed.

The diagnostic module 56 may modify the fault status of a stored DTC to an unconfirmed status if, after a period of time the fault that generated the stored DTC has not recurred. For example only, the diagnostic module 56 may change the fault status from a confirmed status to an unconfirmed status when the fault has not recurred after a predetermined number of drive cycles (e.g., forty vehicle drive cycles). Similarly, the diagnostic module 56 may modify the fault status of a stored DTC to remove a request to illuminate the MIL. For example only, the diagnostic module 56 may modify the fault status when the fault has not recurred within three or more vehicle drive cycles. The fault status generating a MIL request may be modified within a shorter period of vehicle drive time or vehicle drive cycles based on the particular diagnostic instructions.

Figure 3:
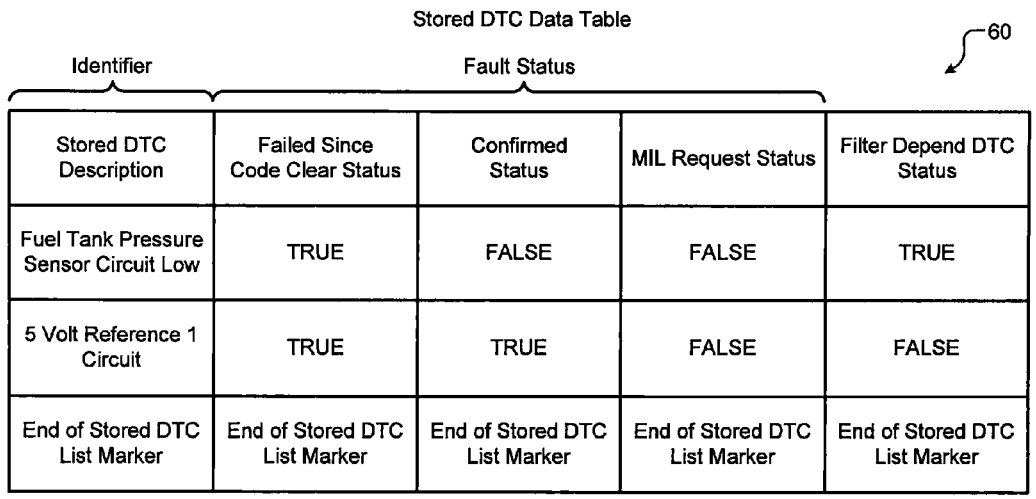
FIG. 3 is a table illustrating an exemplary diagnostic data storage table according to the principles of the present disclosure.

With reference to FIG. 3, an exemplary stored DTC data table 60 is shown. The stored DTC data table 60 includes an array of diagnostic data that may be arranged in series of rows and columns. The diagnostic data may be stored in the stored DTC data table 60 such that the rows include diagnostic fault information for each DTC as shown.

For example only, the diagnostic fault information may include a description of the stored DTC. In the example shown, two DTCs are stored. The first stored DTC includes the DTC description "Fuel Tank Pressure Sensor Circuit Low." The foregoing DTC may be generated and stored by the diagnostic module 56 when a voltage of a fuel pressure sensor (not shown) is below a threshold voltage stored in memory (e.g., ROM 50). The second stored DTC includes the DTC description "5 Volt Reference 1 Circuit" and may be generated and stored when a voltage of the reference circuit for the fuel pressure sensor is not within predetermined voltage limits stored in memory.

The diagnostic fault information also may include diagnostic data that indicates whether the stored DTC has failed since the stored DTC was last cleared, whether or not the stored DTC is confirmed, and whether or not a request to illuminate the MIL has been generated based on the stored DTC. Together, this data may be used to indicate the fault status of the stored DTC. The diagnostic fault information stored in the stored DTC data table 60 also may include data that indicates the filter depend DTC status of each stored DTC according to the principles of the present disclosure.

For simplicity, the individual status of the diagnostic fault information stored in the stored DTC data table 60 for each stored DTC is illustrated in FIG. 3 by "TRUE" and "FALSE." The stored DTC data table 60 may further include a data marker (e.g., "End of Stored DTC List Marker") that indicates the end of the array of stored DTCs.

As previously described, the service tool 80 may be used to retrieve, modify, or clear stored DTCs and other diagnostic data. The service tool 80 may include one or more diagnostic service modes that may be used to retrieve the diagnostic data in a variety of ways. For example only, the service tool 80 may include service modes that may be used to retrieve "active" DTCs, "supported" DTCs, and "history" DTCs. As commonly understood, active DTCs are stored DTCs that failed the last time the diagnostic instructions were executed. Supported DTCs are DTCs recognized by the service tool 80 to be valid for the vehicle system 10. History DTCs are stored DTCs that were previously cleared and have not failed for a period of time, yet remain stored in memory.

The service tool 80 may also include a service mode that may be used to retrieve freeze frame data and a service mode to request the status of a particular DTC, whether stored or not. A service technician operating the service tool 80 may choose one or more of the service modes, depending on the particular task that needs to be performed.

The DTC mask module 58 may filter the diagnostic data retrieved by the service tool 80. Put another way, the DTC mask module 58 may prevent certain diagnostic data stored in the stored DTC data table 60 from being communicated to the service tool 80. The DTC mask module 58 may filter the diagnostic data based on the service mode chosen. More particularly, the DTC mask module 58 may use the filter depend DTC data table 62 to determine whether certain stored DTCs should be communicated to the service tool 80.

Figure 4:
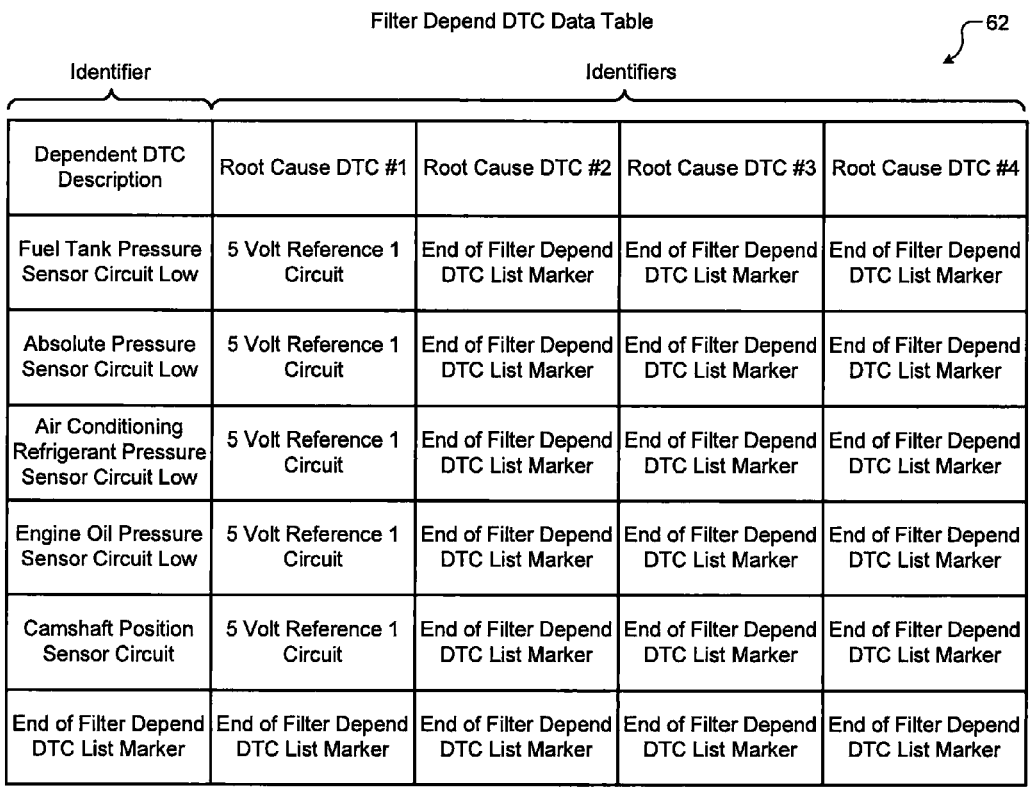
FIG. 4 is a table illustrating an exemplary filter array table according to the principles of the present disclosure.

With reference to FIG. 4, an exemplary filter depend DTC data table 62 according to the principles of the present disclosure is shown. The filter depend DTC data table 62 may include an array of dependent DTC identifiers and corresponding root cause DTC identifiers arranged in series of rows and columns. Each row may include a single dependent DTC identifier along with one or more corresponding root cause DTC identifiers. The filter depend DTC data table 62 also may include a data marker (e.g., "End of Filter Depend DTC List Marker") that indicates the end of the array of stored DTCs.

As used herein, dependent DTCs are DTCs that may be caused by other root cause DTCs. A particular DTC may be determined to be a dependent DTC in a variety of ways. For example only, it may be determined that one particular DTC, the dependent DTC, may fail as a secondary result of the failure of another DTC, the root cause DTC. Additionally, it may be determined that the diagnostic instructions may sometimes result in the inadvertent failure of one particular DTC, the root cause DTC, and trigger the failure of another DTC, the dependent DTC. The determination of whether a particular DTC is dependent on one or more root cause DTCs may be made during the development of the diagnostic instructions for a particular application (e.g., vehicle system 10) or later during the use of the diagnostic instructions by the application.

During the development of the filter depend DTC data table 62, it is preferable to avoid cross dependencies in the data. Cross dependencies may exist where a root cause DTC for a dependent DTC is also a dependent DTC for which one or more root cause DTCs are included. Cross dependencies may be avoided by assuring that the foregoing dependency does not exist in the filter depend DTC data table 62. Cross dependencies may also be avoided during the determination of the filter depend DTC status by ensuring that at least one of the cross-dependent DTCs are reported (i.e., not filtered). For simplicity, the filter depend DTC data table 62 discussed herein does not contain any cross dependencies.

In the exemplary filter depend DTC data table 62, five dependent DTCs are shown. Additionally, a single root cause DTC is shown for each of the dependent DTCs. For example only, with reference to the first row, the first dependent DTC includes the description "Fuel Tank Pressure Sensor Circuit Low." The root cause DTC for the foregoing dependent DTC includes the description "5 Volt Reference 1 Circuit." With reference to the second row, a second dependent DTC having the description "Absolute Pressure Sensor Circuit Low," includes the root cause DTC identified as "5 Volt Reference 1 Circuit." Thus, in the foregoing example, the "5 Volt Reference 1 Circuit" is included as a root cause DTC for both the "Fuel Tank Pressure Sensor Circuit" and the "Absolute Pressure Sensor Circuit." While a single root cause DTC is shown for each dependent DTC, two or more root cause DTCs may be identified and included with each dependent DTC. Additionally, while a root cause DTC may be common to more than one dependent DTC, other root cause DTCs may be identified and included with each dependent DTC.

It may be desired to prevent a DTC in the stored DTC data table 60 identified as a dependent DTC in the filter depend DTC data table 62 from being reported to the service tool 80. Specifically, filtering the stored DTCs identified as dependent DTCs may be desired to avoid reporting stored DTCs that may be misleading. Filtering may also be desired to reduce the time required to diagnose and repair, if necessary, the underlying cause of the diagnostic fault. Reporting stored DTCs identified as dependent DTCs may be misleading where the true underlying problem is caused by a condition related to another stored DTC (i.e. root cause DTC). Filtering may also be used to reduce warranty costs, reduce the time required to develop the diagnostic instructions, and provide additional flexibility in the service procedures related to changes in the hardware included with the vehicle system 10.

Figure 5:
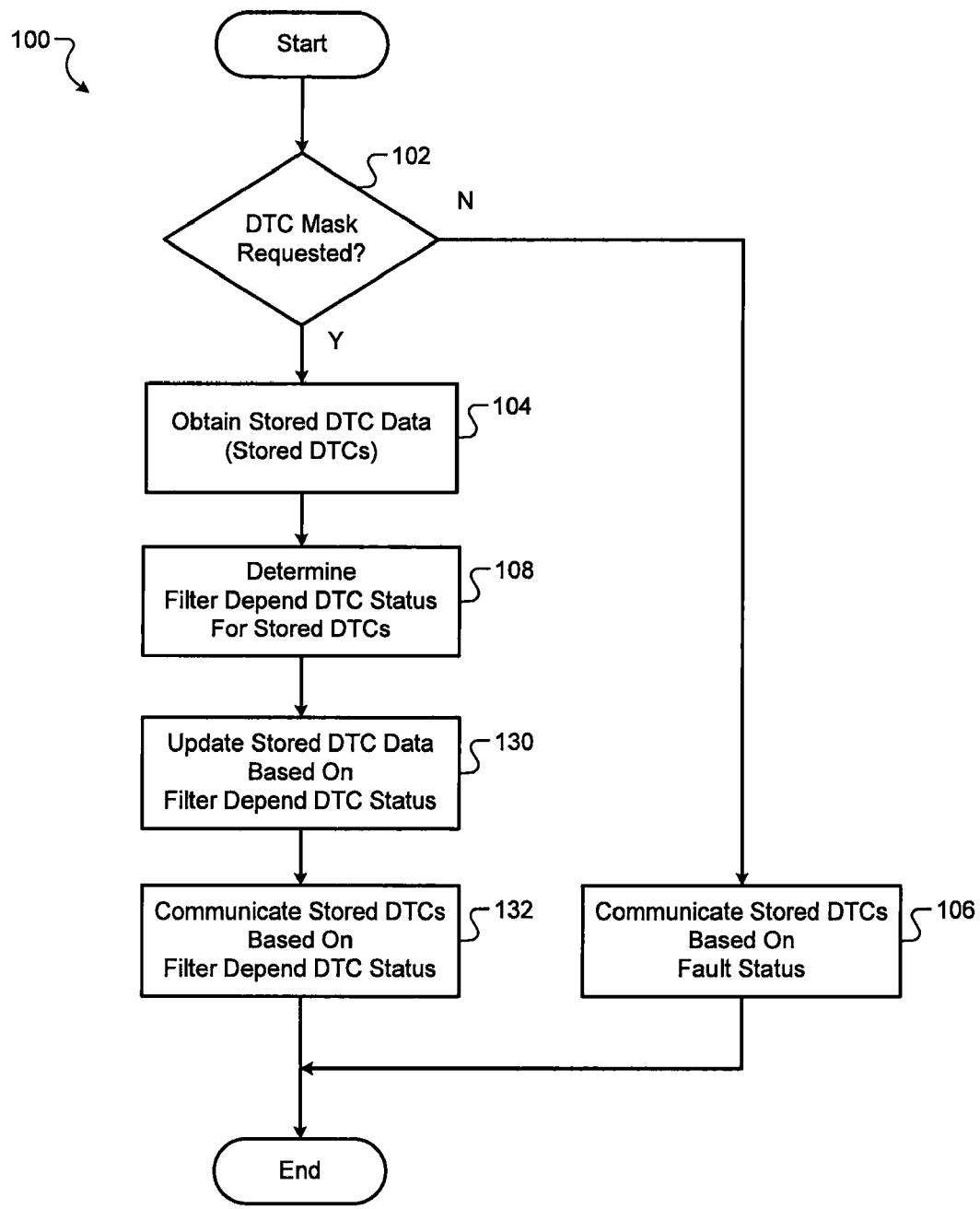
FIG. 5 is a partial flow diagram illustrating exemplary steps for a filtering method according to the principles of the present disclosure.
Figure 6:
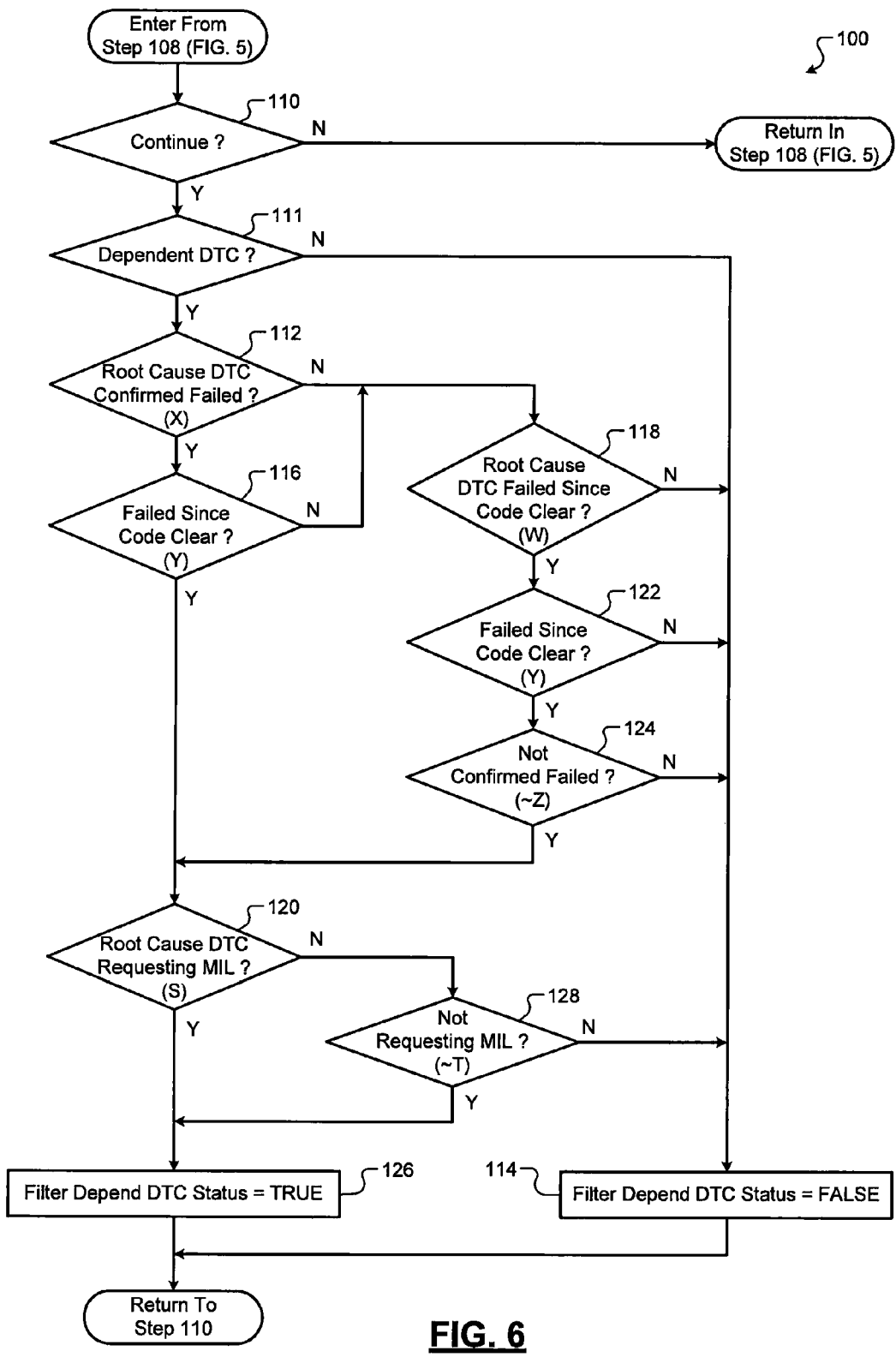
FIG. 6 is a partial flow diagram illustrating additional exemplary steps for the method illustrated in FIG. 5.

With reference to FIGS. 5 and 6 exemplary control steps for reporting stored DTCs based on their corresponding filter depend DTC status is shown and generally designated by reference numeral 100. The method 100 includes exemplary steps for determining the filter depend DTC status for each of the DTCs stored in the stored DTC data table 60. For example only, the method 100 may be implemented in the vehicle control module 12 and executed by the DTC mask module 58. In this manner, the method 100 may be executed at periodic intervals during the regular operation of the vehicle system 10. Alternatively, as discussed herein, the method 100 may be executed upon a request by the service tool 80 for stored diagnostic fault information.

In step 102, control receives a request for diagnostic data and determines whether a DTC mask is requested by the service tool 80. If a DTC mask is requested, then control proceeds in step 104. If a DTC mask is not requested, control proceeds in step 106 where control communicates the stored DTCs according to the service mode request based on fault status independent of the filter depend DTC status of each stored DTC. Thus, for the example shown in FIGS. 3-4, in step 106, both the "Fuel Tank Pressure Sensor Circuit Low" and "5 Volt Reference 1 Circuit" DTCs stored in the stored DTC data table 60 may be communicated to the service tool 80.

In step 104, control obtains the stored DTCs and corresponding fault status by retrieving the current diagnostic data stored in the stored DTC data table 60. In step 104, control may save the current diagnostic data in RAM 52 for use in subsequent control steps.

In step 108, control determines the current filter depend DTC status for each of the stored DTCs obtained in step 104. With particular reference to FIG. 6, exemplary control steps 110-128 for determining the filter depend DTC status is shown and will now be described. Steps 110-128 illustrate exemplary control steps for determining the filter depend DTC status for each stored DTC. Thus, control repeats steps 110-128 for each stored DTC in the current diagnostic data. Put another way, steps 110-128 are repeated for each row in the stored DTC data table 60 until control reaches the end of data list marker (i.e. "End of Stored DTC List Marker"). In steps 110-128, control compares the current diagnostic data and the dependent and root cause DTC data stored in the filter depend DTC data table 62. When comparing the current diagnostic data with the array of data stored in the filter depend DTC data table 62, control proceeds in the filter depend DTC data table 62 until control encounters the end of data list marker.

With the foregoing in mind, control proceeds in step 110 where control determines whether the filter depend DTC status has been determined for all stored DTCs. If the filter depend DTC status has been determined for all DTCs in the stored DTC data table 60, then control proceeds in step 130 (FIG. 5), otherwise control proceeds in step 111.

In step 111, control determines whether the current stored DTC is identified as a dependent DTC in the filter depend DTC data table 62. If the current stored DTC is a dependent DTC, then control proceeds in step 112, otherwise control proceeds in step 114 where control sets the filter depend DTC status for the current stored DTC equal to "FALSE."

In step 112, control determines whether any root cause DTCs identified for the current stored DTC in the filter depend DTC data table 62 are confirmed failed in the diagnostic data obtained in step 104. Put another way, in step 112, control determines whether any other stored DTC in the diagnostic data is identified as a root cause DTC for the current stored DTC and has a confirmed status of TRUE. If a root cause DTC for the current stored DTC is confirmed failed, then control proceeds in step 116, otherwise control proceeds in step 118.

In step 116, control determines whether the current stored DTC has failed since code clear by examining the fault status of the current stored DTC. If the failed since code clear status of the current stored DTC is TRUE, then control proceeds in step 120, otherwise control proceeds in step 118.

In step 118, control determines whether any root cause DTCs identified for the current stored DTC have failed since code clear. Accordingly, in step 118 control examines the fault status of the other stored DTCs in the diagnostic data obtained in step 104. In this manner, control determines whether any other stored DTC is a root cause DTC for the current stored DTC and has a failed since code clear status of TRUE. If a root cause DTC for the current stored DTC has failed since code clear, then control proceeds in step 122, otherwise control proceeds in step 114 where control sets the filter depend DTC status for the current stored DTC equal to "FALSE."

In step 122, control determines whether the current stored DTC has failed since code clear by examining the fault status of the current stored DTC. If the failed since code clear status of the current stored DTC is TRUE, then control proceeds in step 124, otherwise control proceeds in step 114 where control sets the filter depend DTC status for the current stored DTC equal to "FALSE."

In step 124, control determines whether the current stored DTC is confirmed failed by examining the fault status of the current stored DTC. If the current stored DTC is not confirmed failed (i.e. confirmed status is FALSE), then control proceeds in step 120, otherwise control proceeds in step 114 where control sets the filter depend DTC status for the current stored DTC equal to "FALSE."

In step 120, control determines whether any root cause DTCs identified for the current stored DTC is requesting a MIL light. Accordingly, in step 120, control determines whether any other stored DTC in the diagnostic data is identified as a root cause DTC for the current stored DTC and has a MIL request status of TRUE. If any root cause DTC for the current stored DTC is requesting a MIL light, then control proceeds in step 126 where control sets the filter depend DTC status for the current stored DTC equal to "TRUE," otherwise control proceeds in step 128.

In step 128, control determines whether the current stored DTC is requesting a MIL light by examining the fault status of the current stored DTC. If the current stored DTC is not requesting a MIL light (i.e. MIL request status is FALSE), then control proceeds in step 126 where control sets the filter depend DTC status for the current stored DTC equal to "TRUE." If the current stored DTC is requesting a MIL light, control proceeds in step 114 where control sets the filter depend DTC status for the current stored DTC equal to "FALSE."

From the foregoing it will be appreciated that control determines the filter depend DTC status for each of the stored DTCs in the diagnostic data based on the current fault status of the stored DTCs and the array of dependent and root cause DTC data. More specifically, the exemplary method for determining the filter depend DTC status in steps 110-128 may be represented by the following logical expression: If (((X AND Y) OR (W AND Y AND ~Z)) AND (S OR ~T)), then the filter depend status is TRUE, otherwise the filter depend status is FALSE. The letters in the foregoing expression represent the various fault conditions (e.g., fault statuses) examined in steps 110-128 as shown in FIG. 6. While the foregoing expression may be used to describe the method 100 discussed herein, other expressions may be used. For example only, other expressions may be used depending on the particular diagnostic fault information available for each stored DTC and the fault status combinations the diagnostic fault information conveys.

Referring again to FIG. 5, upon completion of steps 110-128 for each stored DTC, control in step 108 ends and control proceeds in step 130. In step 130, control updates the filter depend DTC status in the stored DTC data table 60 for each stored DTC. Next, in step 132, control communicates the stored DTCs to the service tool 80 according to the service mode request based on their corresponding filter depend DTC status. More particularly, control filters the stored DTCs with a filter depend DTC status of TRUE. Thus, for the example shown in FIGS. 3-4, in step 132, control filters "Fuel Tank Pressure Sensor Circuit Low" and communicates the stored DTC "5 volt Reference 1 Circuit 1."

In the foregoing manner, the vehicle control module 12 may filter diagnostic data requested for diagnosis and repair of the vehicle system 10. The diagnostic data is filtered based on a comparison of the diagnostic fault information for each DTC stored in the stored DTC data table 60 and the array of dependent DTC data stored in the filter depend DTC data table 62. As best illustrated by the method 100, stored DTCs are filtered based on a fault status of the stored DTCs and corresponding root cause DTCs.

Those skilled in the art can now appreciate from the foregoing description that the broad teachings of the disclosure can be implemented in a variety of forms. For example, the depend DTC data table 62 may be implemented in the service tool 80. In this manner periodic updates to the filter depend DTC data table 62 may be made in the service tool 80, rather than in the vehicle system 10 (e.g., vehicle control module 12). In that case, the vehicle control module 12 may obtain the array of dependent and root cause data from the service tool 80. Additionally, the method 100 may also be implemented in the service tool 80 to filter diagnostic data that is communicated to the service technician operating the service tool 80. Accordingly, the service tool 80 may be used to update the diagnostic data stored in the stored DTC data table 60.

Therefore, while this disclosure includes particular examples, the true scope of the disclosure should not be so limited since other modifications will become apparent to the skilled practitioner upon a study of the drawings, the specification, and the following claims.

What is claimed is:

1. A control system comprising:
an input that one of receives and transmits diagnostic data generated by a vehicle, wherein said diagnostic data includes a first fault identifier and a first fault status of said first fault identifier, and a second fault identifier and a second fault status of said second fault identifier; and
a filter module that filters said diagnostic data based on a comparison of said diagnostic data and a data array, wherein said data array includes a dependent identifier and a corresponding root cause identifier, and wherein said filter module filters said first fault identifier and said first fault status when said first fault identifier is equal to said dependent identifier and a logical expression (X AND Y) is TRUE, wherein:
X is TRUE when said second fault identifier is equal to said root cause identifier and said second fault status is TRUE, and
Y is TRUE when said first fault status is TRUE.

2. The control system of claim 1 wherein said filter module filters said diagnostic data when communicating with a service tool.

3. The control system of claim 2 wherein said filter module filters said diagnostic data based on a service mode of said service tool.

4. A vehicle control module comprising the control system of claim 1.

5. A service tool comprising the control system of claim 1.

6. A method comprising:
receiving diagnostic data generated by a vehicle, said diagnostic data including a first fault identifier and a first fault status of said first fault identifier, and a second fault identifier and a second fault status of said second fault identifier;
accessing a data array including a dependent identifier and a corresponding root cause identifier;
comparing said first fault identifier and said second fault identifier to said dependent identifier and said root cause identifier; and
filtering said diagnostic data based on said comparing of said first and second fault identifiers to said dependent and root cause identifiers, wherein said filtering of said diagnostic data includes filtering said first fault identifier and said first fault status when said first fault identifier is equal to said dependent identifier and a logical expression (X AND Y) is TRUE, wherein:
X is TRUE when said second fault identifier is equal to said root cause identifier and said second fault status is TRUE, and
Y is TRUE when said first fault status is TRUE.

7. The method of claim 6 wherein said filtering said diagnostic data includes filtering said diagnostic data when communicating with a service tool.

8. The method of claim 7 wherein said filtering said diagnostic data includes filtering said diagnostic data based on a service mode of said service tool.

9. A control system comprising:
an input that one of receives and transmits diagnostic data including a first fault identifier and a first fault status of said first fault identifier, and a second fault identifier and a second fault status of said second fault identifier, wherein each said first and second fault statuses includes a failed since code clear status, a confirmed status, and an indicator lamp request status; and
a filter module that filters said diagnostic data based on a comparison of said diagnostic data and a data array, wherein said data array includes a dependent identifier and a corresponding root cause identifier, and wherein said filter module filters said first fault identifier when said first fault identifier is equal to said dependent identifier and a logical expression ((X AND Y) AND (S OR ~T)) is TRUE, wherein:
X is TRUE when said second fault identifier is equal to said root cause identifier and said confirmed status of said second fault identifier is TRUE,
Y is TRUE when said failed since code clear status of said first fault identifier is TRUE,
S is TRUE when said indicator lamp request status of said second fault identifier is TRUE, and
~T is TRUE when said indicator lamp request status of said first fault identifier is not TRUE.

10. A control system comprising:
an input that one of receives and transmits diagnostic data including a first fault identifier and a first fault status of said first fault identifier, and a second fault identifier and a second fault status of said second fault identifier, wherein each said first and second fault statuses includes a failed since code clear status, a confirmed status, and an indicator lamp request status; and
a filter module that filters said diagnostic data based on a comparison of said diagnostic data and a data array, wherein said data array includes a dependent identifier and a corresponding root cause identifier, and wherein said filter module filters said first fault identifier when said first fault identifier is equal to said dependent identifier and a logical expression ((W AND Y AND ~Z) AND (S OR ~T)) is TRUE, wherein:
W is TRUE when said second fault identifier is equal to said root cause identifier and said failed since code clear status of said second fault identifier is TRUE,
Y is TRUE when said failed since code clear status of said first fault identifier is TRUE,
~Z is TRUE when said confirmed status of said first fault identifier is not TRUE,
S is TRUE when said indicator lamp request status of said second fault identifier is TRUE, and
~T is TRUE when said indicator lamp request status of said first fault identifier is not TRUE.

11. A method comprising:
receiving diagnostic data including a first fault identifier and a first fault status of said first fault identifier, and a second fault identifier and a second fault status of said second fault identifier, wherein each said first and second fault statuses includes a failed since code clear status, a confirmed status, and an indicator lamp request status; and
filtering said diagnostic data based on a comparison of said diagnostic data and a data array, wherein said data array includes a dependent identifier and a corresponding root cause identifier, and wherein said filtering said diagnostic data includes filtering said first fault identifier when said first fault identifier is equal to said dependent identifier and a logical expression ((X AND Y) AND (S OR ~T)) is TRUE, wherein:
X is TRUE when said second fault identifier is equal to said root cause identifier and said confirmed status of said second fault identifier is TRUE,
Y is TRUE when said failed since code clear status of said first fault identifier is TRUE, and
S is TRUE when said indicator lamp request status of said second fault identifier is TRUE, and ~T is TRUE when said indicator lamp request status of said first fault identifier is not TRUE.

12. A method comprising:

receiving diagnostic data including a first fault identifier and a first fault status of said first fault identifier, and a second fault identifier and a second fault status of said second fault identifier, wherein each said first and second fault statuses includes a failed since code clear status, a confirmed status, and an indicator lamp request status; and filtering said diagnostic data based on a comparison of said diagnostic data and a data array, wherein said data array includes a dependent identifier and a corresponding root cause identifier, and wherein said filtering said diagnostic data includes filtering said first fault identifier when said first fault identifier is equal to said dependent identifier and a logical expression ((W AND Y AND ~Z) AND (S OR ~T)) is TRUE, wherein:

W is TRUE when said second fault identifier is equal to said root cause identifier and said failed since code clear status of said second fault identifier is TRUE, Y is TRUE when said failed since code clear status of said first fault identifier is TRUE, ~Z is TRUE when said confirmed status of said first fault identifier is not TRUE, S is TRUE when said indicator lamp request status of said second fault identifier is TRUE, and ~T is TRUE when said indicator lamp request status of said first fault identifier is not TRUE.

* * * * *